(12) United States Patent
Fioravanti

(10) Patent No.: US 6,404,580 B1
(45) Date of Patent: Jun. 11, 2002

(54) WRITING SERVO DATA ON STATIONARY DISCS

(75) Inventor: Louis J. Fioravanti, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/395,412

(22) Filed: Sep. 14, 1999

Related U.S. Application Data

(60) Provisional application No. 60/100,214, filed on Sep. 14, 1998.

(51) Int. Cl.[7] ............................................... G11B 21/02
(52) U.S. Cl. ......................................................... 360/75
(58) Field of Search ..................... 360/101, 75; 369/177

(56) References Cited

U.S. PATENT DOCUMENTS

| | | | | |
|---|---|---|---|---|
| 3,633,186 A | * | 1/1972 | Lynott | 360/101 |
| 5,172,282 A | * | 12/1992 | Ghose | 360/101 X |
| 5,375,020 A | * | 12/1994 | Aggarwal et al. | 360/75 |
| 5,570,247 A | * | 10/1996 | Brown et al. | 360/75 |
| 5,870,249 A | * | 2/1999 | Yanagisawa | 360/101 |

* cited by examiner

Primary Examiner—David Hudspeth
Assistant Examiner—K. Wong
(74) Attorney, Agent, or Firm—Crowe & Dunlevy

(57) ABSTRACT

Apparatus and method for writing servo data to a disc of a disc drive. A disc pack comprising a disc and a spindle motor is mounted in a stationary disc servo track writing (STW) fixture, which maintains the disc in a nonrotating, stationary relation while rotating a servo write head around a circumference of the disc to write the servo data to the disc. Once the servo data are written and verified, the disc is removed from the STW fixture and installed into a disc drive. The STW fixture preferably comprises a stationary base portion, top and bottom clamp members which extend from the base portion to hold the disc in the nonrotating, fixed relation, and a rotatable enclosure, adjacent the base portion, which supports the servo write head and rotates with respect to the base portion using air bearings.

10 Claims, 4 Drawing Sheets

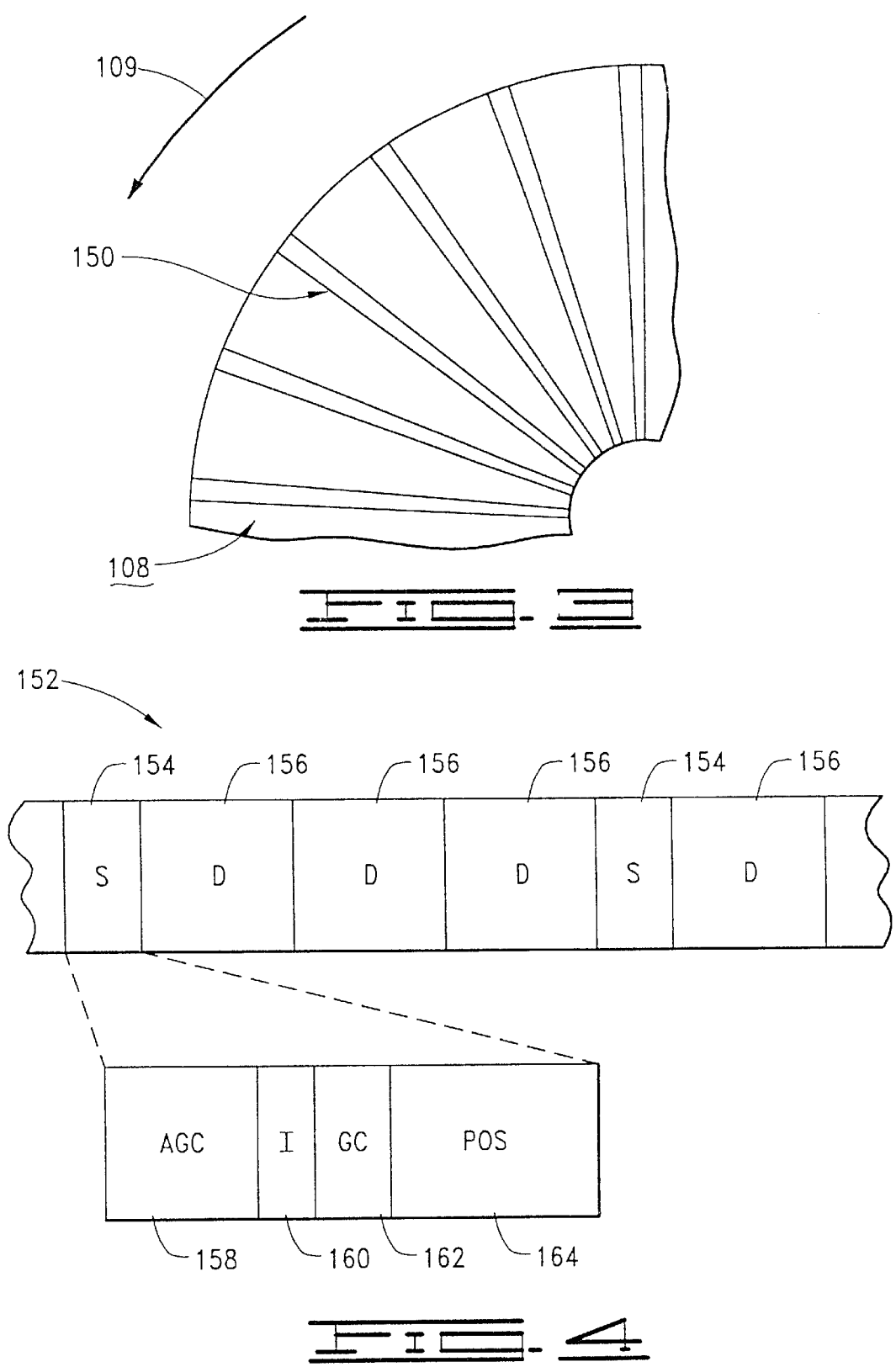

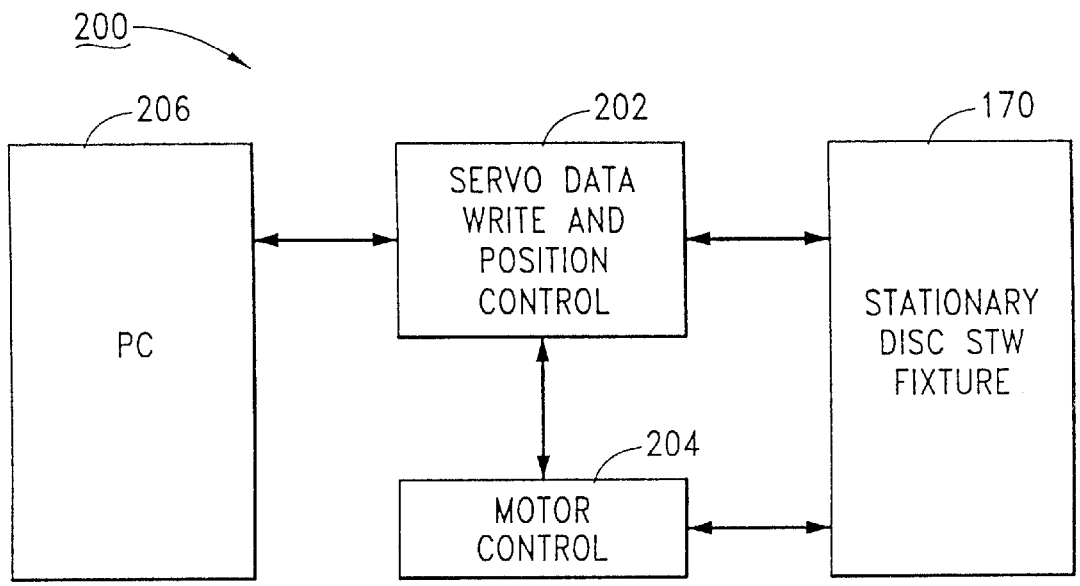
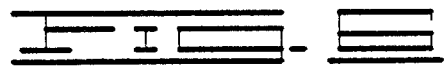
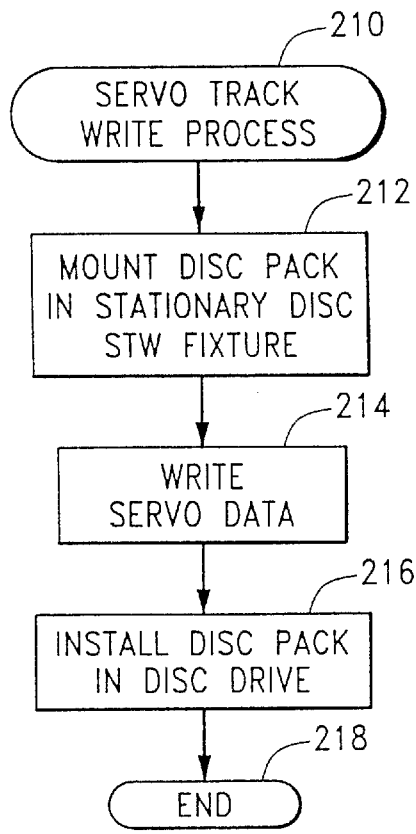
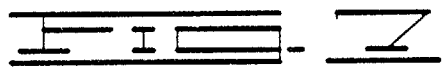

WRITING SERVO DATA ON STATIONARY DISCS

RELATED APPLICATIONS

This application claims the benefit of Provisional Application No. 60/100,214 filed Sep. 14, 1998.

FIELD OF THE INVENTION

This invention relates generally to the field of disc drive storage devices, and more particularly, but not by way of limitation, to improvements in the writing of servo data to discs of a disc drive.

BACKGROUND OF THE INVENTION

Disc drives are commonly used in workstations, personal computers, laptops and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extend circumferentially around the discs and store data in the form of magnetic flux transitions within the radial extent of the tracks on the disc surfaces.

Typically, each data track is divided into a number of data sectors that store fixed sized blocks of user data. Embedded among the sectors on each track are servo fields that enable the disc drive to control the position of heads used to transfer the user data between the discs and a host computer. More particularly, the heads are mounted to a rotary actuator assembly which includes a coil of a voice coil motor, so that the position of the heads relative to the tracks can be maintained by the application of current to the coil by a closed loop digital servo system in response to the servo information read by the servo fields. For a discussion of a typical digital servo system, see U.S. Pat. No. 5,262,907 issued Nov. 16, 1993 to Duffy et al., assigned to the assignee of the present invention.

The servo fields are written to the discs during the manufacture of the disc drives using a highly precise servo track writer, which utilizes the heads of the disc drive to write the servo fields. As the servo fields are used to define the tracks, it is important to precisely control the position of the heads as the servo fields are written to the disc surfaces. Thus, a typical servo track writer comprises a closed loop, laser based positioning system having a pusher pin which engages the actuator assembly and advances the position of the heads, a position detector which detects the position of the pusher pin and a motor which corrects the position of the pusher pin in response to correction signals from the position detector. Additionally, a typical servo track writer includes control circuitry for providing the servo information to be stored in the servo fields. For a more detailed discussion of typical servo track writing (STW) methodologies, see U.S. Pat. No. 5,164,863 issued Nov. 17, 1992 to Janz and U.S. Pat. No. 5,241,430 issued Aug. 31, 1993 to Janz, both of which are assigned to the assignee of the present invention.

As will be recognized, proper radial alignment of the servo fields is essential to facilitate reliable operation of the disc drive. If errors are introduced in the placement of the servo fields, components at corresponding frequencies can appear in a position error signal (PES) generated by the servo system during subsequent operation of the drive. The PES is a measure of the relative position of a selected head with respect to an associated track and is used primarily during track following operations to maintain the head over the center of the track. Such frequency components appearing in the PES for a selected track will result in the repeated adjustment of the position of the head by the servo system in an attempt to maintain the head over the center of the track during each revolution of the disc. When such frequencies are sufficiently severe, the correction required to account for these frequencies can require a significant amount of the total track misregistration budget, limiting the overall track density that can be achieved in a disc drive design.

One particularly pervasive source of errors induced during the STW process is the spindle motor, which includes bearing assemblies with characteristic frequencies that are generated from the rotation of the balls and ball cages within the inner and outer bearing raceways. These bearing frequencies are predictable and repeatable, and are not necessarily synchronized with the rotational frequency of the discs. These bearing frequencies can result in low frequency errors (artifacts) being laid down in the servo pattern. These artifacts result even if a separate motor is used to rotate the spindle motor during the STW process.

Accordingly, there is a need for an improved approach to reducing errors as servo data are written to discs of a disc drive to reduce or eliminate the effects of frequency components in a PES generated from the servo data during subsequent disc drive operation.

SUMMARY OF THE INVENTION

The present invention is directed to an apparatus and method for writing servo data to a disc of a disc drive.

In accordance with preferred embodiments, a disc pack comprising a disc and a spindle motor is mounted in a stationary disc servo track writing (STW) fixture, which maintains the disc in a nonrotating, stationary relation while rotating a servo write head around a circumference of the disc to write the servo data to the disc. Once the servo data are written and verified, the disc is removed from the STW fixture and installed into a disc drive.

The STW fixture preferably comprises a stationary base portion, top and bottom clamp members which extend from the base portion to hold the disc in the nonrotating, fixed relation, and a rotatable enclosure, adjacent the base portion, which supports the servo write head and rotates with respect to the base portion. The enclosure preferably uses air bearings to rotate with respect to the base portion.

By holding the disc in a stationary relation, the spindle motor bearings are not rotated, which eliminates the introduction of low frequency spindle bearing artifacts in the resulting servo data. Greater manufacturing efficiencies are also achieved since the servo data are written at the disc pack level instead of at the disc drive level as in the prior art, allowing improvements in rework, throughput and automation.

These and various other features as well as advantages which characterize the present invention will be apparent from a reading of the following detailed description and a review of the associated drawings.

BRIEF DESCRIPTION OF THE DRAWINGS

FIG. 4 is a representation of a portion of a track of the disc of FIG. 3 illustrating the respective arrangement of servo data fields and user data fields, as well as a preferred format for the servo data fields.

FIG. 5 is an elevational, cross-sectional view of a stationary disc servo track writer (STW) fixture constructed and used in accordance with preferred embodiments of the present invention.

FIG. 6 is a functional block diagram of a STW system incorporating the STW fixture of FIG. 5.

FIG. 7 is a SERVO TRACK WRITE PROCESS illustrating the steps used to provide servo data on discs of a disc drive such as the disc drive of FIG. 1 in accordance with preferred embodiments of the present invention.

DETAILED DESCRIPTION

Figure 1:
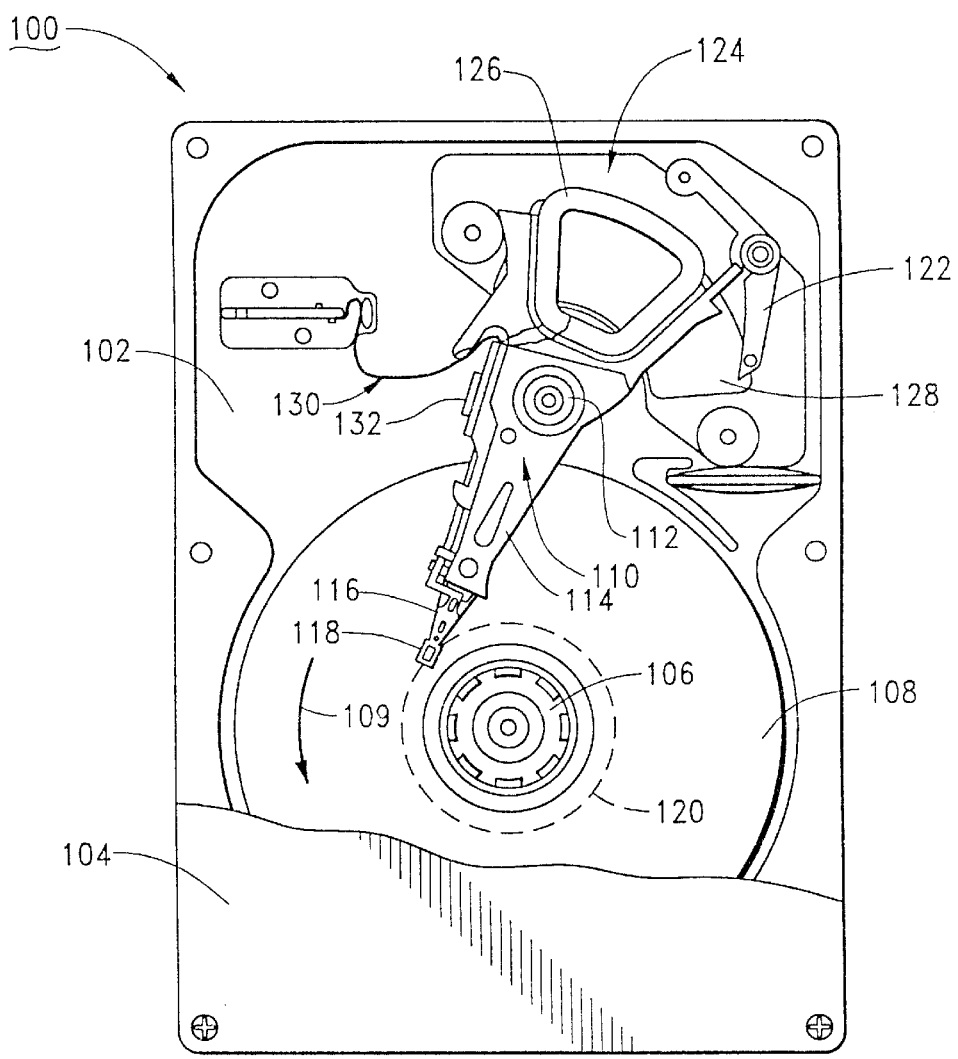
FIG. 1 shows a top plan view of a disc drive constructed in accordance with preferred embodiments of the present invention.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant high speed (in thousands of revolutions per minute) in an angular direction denoted by arrow 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108, with flexible suspension assemblies 116 (flexures) extending therefrom. Mounted at the distal end of each of the flexures 116 is a head 118 which includes a slider assembly (not separately designated) designed to fly in close proximity to the corresponding surface of the associated disc 108. The heads 118 are preferably characterized as magneto-resistive (MR) heads each having a thin-film inductive write element and an MR read element.

When the disc drive 100 is not in use, the heads 118 are moved over and come to rest upon landing zones 120 near the inner diameter of the discs 108 and the actuator assembly 110 is secured using a magnetic latch assembly 122.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. A second magnetic flux path is disposed above the permanent magnet 128, but has not been shown for purposes of clarity. The heads 118 are moved across the surfaces of the discs 108 through the application of current to the coil 126.

A flex assembly 130 provides the requisite electrical connection paths for the actuator assembly 110 while allowing pivotal movement of the actuator assembly 110 during operation. The flex assembly 130 includes a preamplifier/driver circuit 132 (preamp) which applies write currents to the write elements of the heads 118 during a write operation and applies read bias currents to the MR read elements of the heads 118 during a read operation. The preamp 132 further amplifies readback signals obtained during a read operation and provides the same to disc drive control electronics (not shown) disposed on a disc drive printed circuit board (PCB) attached to the underside of the base deck 102.

Figure 2:
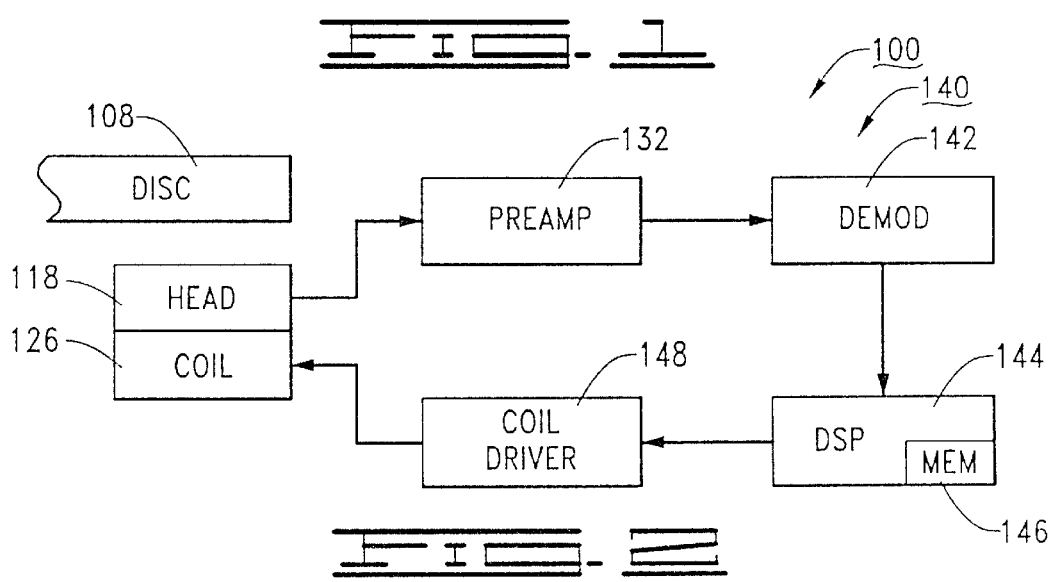
FIG. 2 provides a functional block diagram of a servo circuit of the disc drive of FIG. 1.

FIG. 2 shows a functional block diagram of a servo circuit 140 of the disc drive 100 of FIG. 1 which uses servo data arranged on the discs 108 to control the position of the heads 118. The servo data are transduced by the selected head 118, preamplified by the preamp 132, and provided to a demodulation circuit 142 which conditions the servo data for processing by a servo processor 144, which preferably comprises a digital signal processor (DSP). The DSP 144 uses programming steps stored in DSP memory 146 (MEM) as well as commands issued by a top-level disc drive processor (not shown) to output current command signals to coil driver circuitry 148 which, in turn, adjusts the amount of current applied to the coil 126.

Figure 3:
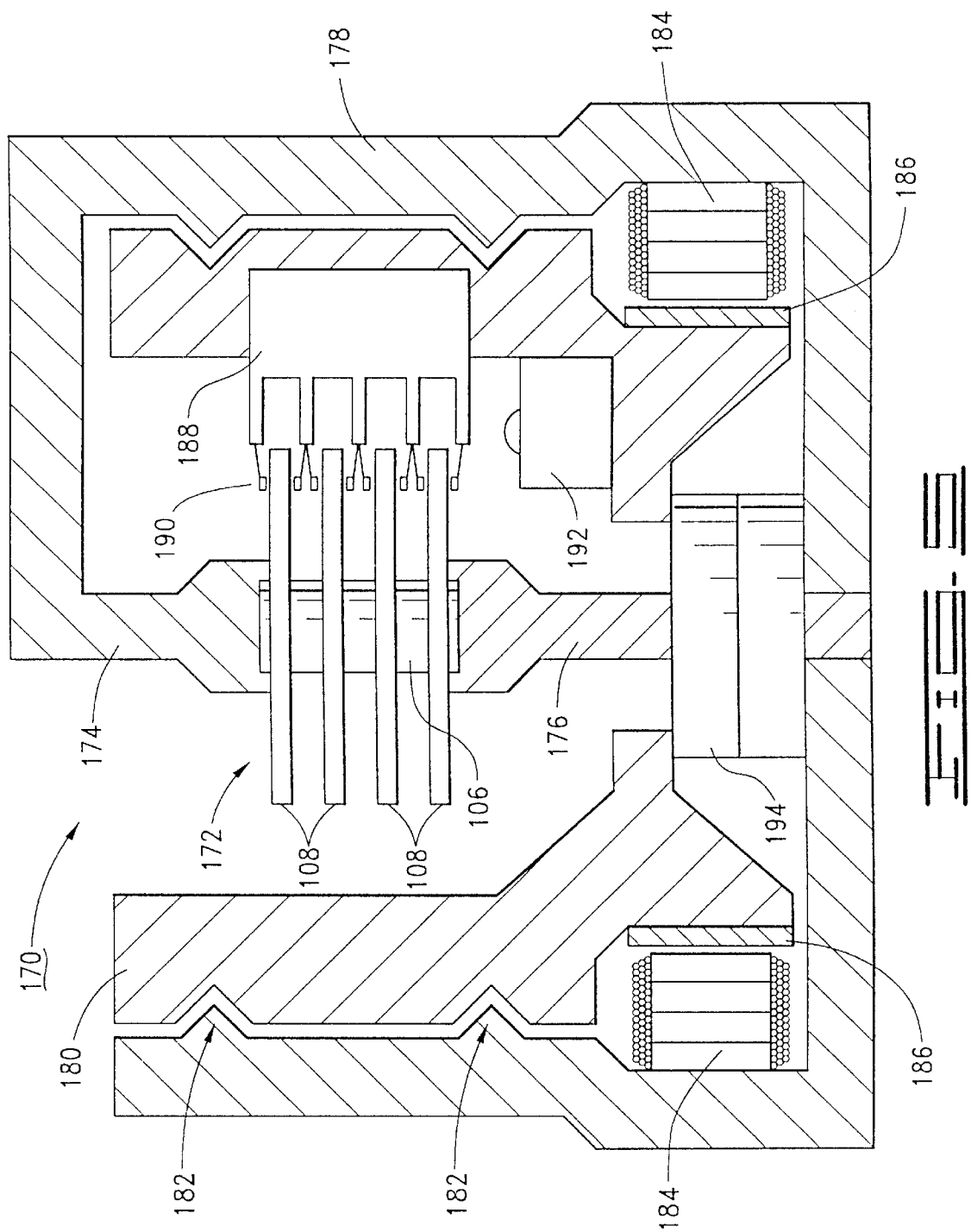
FIG. 3 illustrates the manner in which servo data are preferably arranged on the discs of the disc drive of FIG. 1.

The servo data are preferably arranged on the discs 108 as shown in FIGS. 3–4. FIG. 3 provides a portion of a selected one of the discs 108 with a plurality of servo wedges 150 which radially extend from the innermost to the outermost radii of the disc recording surface. As discussed more fully below, the servo wedges 150 are written during disc drive manufacturing and each servo wedge comprises a plurality of radially aligned servo fields, with each servo field corresponding to a particular track on the disc surface. User data are stored in the areas between adjacent servo wedges. While the number of servo wedges 150 will vary depending upon the application, for purposes of the present discussion it will be contemplated that there are a total of 100 such wedges on each disc surface.

FIG. 4 shows a portion of a track 152 at a selected radius on the disc 108, illustrating the arrangement of respective servo fields 154 and user data fields 156. Each servo field 154 preferably includes an automatic gain control (AGC) field 158, an index field 160, a Gray code (GC) field 162 and a position (POS) field 164. The AGC field 158 provides an oscillating signal that prepares the servo circuit 140 for remaining portions of the servo field 154, the index field 160 provides an angular reference for the servo circuit 140, the GC field 162 provides a unique track address to indicate radial position for the track, and the POS field 164 provides an arrangement of servo patterns that allows the servo circuit 140 to perform intra-track positioning. It will be apparent that other servo field configurations can be readily employed, including different arrangements of servo fields as well as a dedicated servo scheme wherein one disc surface is used to store servo data and the remaining discs are used to store user data.

In accordance with preferred embodiments of the present invention, the servo data are written using a stationary disc servo track writer (STW) fixture, such as shown in FIG. 5 and generally denoted at 170. Unlike prior art STW systems which rotate the discs, the STW fixture holds the discs in a stationary relationship and rotates an array of servo write heads around the discs. Because the spindle motor bearing assemblies do not rotate, no spindle motor bearing artifacts are introduced into the servo data.

With reference to FIG. 5, a disc pack 172 (comprising a total of four discs 108 mounted to the spindle motor 106 of FIG. 1) is clamped in place using oppositely disposed, top and bottom clamp members 174, 176. It will be understood that the top clamp member 174 is preferably configured to be both vertically and rotatably articulated to allow the disc pack 172 to be readily moved into position, with such features being omitted from FIG. 5 to simplify the illustration. Of course, the disc pack 172 can readily be provided with a different number of discs 108.

The clamp members 174, 176 extend from a stationary base portion 178 which enshrouds a rotatable, substantially cylindrical enclosure 180. A pair of air bearings 182 are used to enable rotation of the enclosure 180 relative to the base portion 178. As will be recognized, an air bearing utilizes a layer of pressurized air as a bearing surface. The enclosure 180 is rotated at a selected rotational velocity through the application of current to a plurality of angularly disposed coils 184 mounted to the base portion 178, which magnetically interact with a corresponding plurality of permanent magnets 186 mounted to the enclosure 180. The enclosure 180 is contemplated as being axially and radially balanced.

An actuator assembly 188 is mounted to an interior surface of the enclosure, with the actuator assembly 188 suspending a plurality of servo write heads 190 adjacent the discs 108. The actuator assembly 188 includes an actuator motor (not separately designated) to move the heads 190 with respect to the disc surfaces. The actuator assembly 188 can be rotary (as with the rotary actuator assembly 110 of FIG. 1), or linear in nature. In either case, it is important that the actuator assembly 188 be configured to retract out of the way to allow insertion of the disc pack 172 into (and removal of the disc pack from) the STW fixture 170. Although not shown in FIG. 5, such retraction will further require support for the heads 190 (using a retractable ramp assembly, for example) to allow the heads 190 to be subsequently loaded between the respective discs 108.

A position detector 192 (generally represented in FIG. 5 as laser based) is disposed adjacent the actuator assembly 188 to provide closed loop positional feedback as the heads 190 are advanced across the disc surfaces. Although the position detector 192 is shown to be below the actuator assembly 188 (as is generally the case in prior art STW systems), it will be understood that the position detector 192 can be readily moved to other positions within the enclosure, including to a position opposite the actuator assembly 188, provided adequate positioning detection can be obtained. Electrical signals leading to and from the heads 190, the actuator motor of the actuator assembly 188 and the position detector 192 are preferably routed through a conventional mercury wetted coupler 194. For simplicity of illustration, signal wires between these various components have been omitted.

FIG. 6 provides a functional block diagram of a STW system 200 which uses the STW fixture 170 of FIG. 5 to write servo data to the discs 108 of the disc drive 100. The STW system 200 includes a servo data write and position control circuit 202 which emulates the read/write electronics of the disc drive 100 sufficiently to control the writing and subsequent verification of the servo data. The control circuit 202 further receives the output signals from the position detector 192 and provides current command inputs to the actuator assembly 188 to provide closed loop positional control of the heads 190.

A motor control circuit 204 operates to rotate the enclosure 180 at the desired rotational velocity through back electromotive force (bemf) commutation of the coils 184 in a generally conventional fashion. A personal computer (PC) 206 provides top level control of the STW system 200 and is provided with suitable programming and a user interface to allow a user to control the STW operation.

FIG. 7 shows a flow chart for a SERVO TRACK WRITE PROCESS 210, representative of steps carried out in accordance with preferred embodiments to write servo data on the discs 108 of the disc drive 100 during manufacturing in a clean room environment.

At step 212, an assembled disc pack (such as the disc pack 172 in FIG. 5) is mounted into the STW fixture 170. As discussed above, this step will include articulation of the top clamp member 174 to grasp and lower the disc pack 172 into position, as well as retraction and subsequent insertion of the heads 190 into the disc pack.

The servo data are next written, as shown by step 214, which entails a generally conventional STW operation except that the heads 190 are rotated, and not the discs 108. It will be noted that prior art STW systems typically insert a separate clock head into the side of the disc drive base deck to write a high frequency clock signal on an outer guard band (beyond the data recording surface), with the system using the detected frequency of the clock signal to time the respective writing of the servo data. Accordingly, in one preferred embodiment a separate clock head (not shown) is additionally disposed adjacent a selected disc surface and used to write the requisite clock signal. It will be appreciated that the clock head needs to be rotated about the stationary discs 108 and so will be affixed to an appropriate portion of the enclosure 180.

As the enclosure 180 is rotated, the heads 190 will be caused to fly above the disc surfaces and the servo data will be written and subsequently verified in an otherwise conventional fashion. Once verified, as shown by step 216 the disc pack 172 is removed from the STW fixture 170 and mated with the base deck 102 of the disc drive 100, after which the routine ends at 218.

It will now be appreciated that the STW fixture 170 provides several advantages over the prior art. First and foremost, by holding the disc pack 172 stationary, the spindle motor bearings are not rotated, which eliminates the introduction of low frequency spindle bearing artifacts in the resulting servo data. However, the use of air bearings in the STW fixture 170 also reduces or eliminates other system resonances normally associated with prior art STW systems, further improving the accuracy of the written servo data.

The STW fixture 170 also generally provides greater manufacturing efficiencies as compared to prior art systems. Since the servo data are written at the disc pack level (instead of the disc drive level), a defective disc pack requiring rework or scrap does not have to be removed from a higher level assembly. Reduction of system resonances allows the servo data to potentially be written at a higher rotational frequency (increasing throughput), and use of robotic arms to insert and remove the disc pack 172 makes the STW process suitable for inclusion in an automated assembly line.

In summary, the present invention is directed to an apparatus and method for writing servo data to a disc of a disc drive. In accordance with preferred embodiments, a disc 108 is mounted in a stationary disc servo track writing (STW) fixture 170, which maintains the disc in a nonrotating, stationary relation while rotating a servo write head 190 around a circumference of the disc to write the servo data to the disc. Once the servo data are written and verified, the disc is removed from the STW fixture and installed into a disc drive 100.

The STW fixture preferably comprises a stationary base portion 178, top and bottom clamp members 174, 176 which extend from the base portion to hold the disc in the nonrotating, fixed relation, and a rotatable enclosure 180, adjacent the base portion, which supports the servo write head and rotates with respect to the base portion. The enclosure preferably uses air bearings 182 to rotate with respect to the base portion.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for writing servo data to a disc of a disc drive, comprising of:

(a) mounting the disc in a stationary disc servo track writing fixture comprising a servo write head; and (b) writing the servo data to the disc by rotating the servo write head around a circumference of the disc while maintaining the disc in a stationary, nonrotating relation.

2. The method of claim 1, further comprising a step of:

(c) subsequently installing the disc with the written servo data into the disc drive.

3. The method of claim 1, wherein the writing step (b) further comprises rotating a clock head around the circumference of the disc to write a clock track which is subsequently read by the clock head to provide a clock frequency used to write the servo data by the servo write head.

4. The method of claim 1, wherein the mounting step (a) comprises securing the disc to a stationary base portion of the stationary disc servo track writing fixture, and wherein the writing step (b) comprises rotating an enclosure of the stationary disc servo track writing fixture about the disc, the enclosure supporting the servo write head.

5. The method of claim 4, wherein the enclosure used during the writing step (b) includes air bearings to rotate with respect to the base portion.

6. Apparatus for writing servo data to a disc of a disc drive, comprising:

a stationary base portion which supports the disc; and a rotatable enclosure, coupled to the base portion, configured to rotate a servo write head around a circumference of the disc to write the servo data to the disc as the disc is held by the base portion in a stationary, nonrotating relation.

7. The apparatus of claim 6, further comprising a clock head, supported by the enclosure, configured to rotate around the circumference of the disc to write a clock track which is subsequently read by the clock head to provide a clock frequency used to write the servo data by the servo write head.

8. The apparatus of claim 6, wherein the base portion comprises top and bottom clamp members, extending from the base portion, which hold the disc in the nonrotating, fixed relation.

9. The apparatus of claim 8, wherein the enclosure uses air bearings to rotate with respect to the base portion.

10. Apparatus for writing servo data to a disc of a disc drive, comprising:

a servo write head; and means for rotating the servo write head around a circumference of the disc to write the servo data to the disc as the disc is held in a stationary, nonrotating relation.

\* \* \* \* \*